US008365059B2

(12) United States Patent
Walsh et al.

(10) Patent No.: US 8,365,059 B2
(45) Date of Patent: Jan. 29, 2013

(54) E-READER SEMANTIC TEXT MANIPULATION

(75) Inventors: Richard J. Walsh, Raleigh, NC (US);
Alfredo C. Issa, Apex, NC (US);
Michael W. Helpingstine, Chapel Hill, NC (US)

(73) Assignee: Oto Technologies, LLC, Raleigh, NC (US)

( * ) Notice: Subject to any disclaimer, the term of this patent is extended or adjusted under 35 U.S.C. 154(b) by 492 days.

(21) Appl. No.: 12/611,242

(22) Filed: Nov. 3, 2009

(65) Prior Publication Data
US 2011/0107206 A1 May 5, 2011

(51) Int. Cl.
*G06F 17/00* (2006.01)

(52) U.S. Cl. ........................ 715/200; 715/864
(58) Field of Classification Search .................. 715/200, 715/255, 256, 273, 864
See application file for complete search history.

(56) References Cited

U.S. PATENT DOCUMENTS

| 7,319,951 B2 | 1/2008 | Rising, III et al. |
| 2005/0005240 A1* | 1/2005 | Reynar et al. ............... 715/533 |
| 2005/0057524 A1* | 3/2005 | Hill et al. .................... 345/173 |
| 2005/0240391 A1* | 10/2005 | Lekutai ........................ 704/2 |
| 2007/0033590 A1 | 2/2007 | Masuouka et al. |
| 2008/0077859 A1* | 3/2008 | Schabes et al. ............. 715/257 |
| 2008/0109475 A1* | 5/2008 | Burmester et al. .......... 707/102 |
| 2008/0294641 A1 | 11/2008 | Kim |
| 2008/0316212 A1* | 12/2008 | Kushler ...................... 345/467 |
| 2009/0058860 A1 | 3/2009 | Fong et al. |
| 2009/0109182 A1* | 4/2009 | Fyke et al. .................. 345/173 |
| 2009/0167704 A1* | 7/2009 | Terlizzi et al. .............. 345/173 |
| 2009/0216911 A1* | 8/2009 | Long ............................ 710/2 |
| 2010/0131294 A1* | 5/2010 | Venon et al. ................. 705/3 |
| 2010/0137031 A1* | 6/2010 | Griffin et al. ................ 455/566 |
| 2010/0161318 A1* | 6/2010 | Lowles et al. .............. 704/10 |
| 2010/0180197 A1* | 7/2010 | Ohashi ........................ 715/256 |
| 2010/0235784 A1* | 9/2010 | Ording et al. ............... 715/810 |
| 2011/0016389 A1* | 1/2011 | Gordon et al. .............. 715/271 |
| 2011/0148767 A1* | 6/2011 | Kong ............................ 345/168 |
| 2011/0191692 A1* | 8/2011 | Walsh et al. ................ 715/752 |

(Continued)

FOREIGN PATENT DOCUMENTS
WO 2008/071002 A1 6/2008

OTHER PUBLICATIONS

Kanes et al., Slide Rule: Making Mobile Touch Screen Accessible to Bind People Using Multi-Touch Interaction Techniques, ACM 2008, pp. 73-80.*

(Continued)

*Primary Examiner* — Cong-Lac Huynh
(74) *Attorney, Agent, or Firm* — Withrow & Terranova, PLLC

(57) ABSTRACT

A computerized system and method for changing the textual length of an electronic text content while maintaining the meaning of the electronic text content is disclosed. The system includes an electronic reader, or e-reader, device having an electronic touch screen for displaying an electronic text content and for receiving a user touch gesture for identifying a portion of the electronic text content targeted for a textual length change, and a semantic server programmed to receive requests for a semantic text alternative for a targeted electronic text content identified by way of the e-reader device and to determine a semantic alternative electronic text content for the targeted electronic text content, wherein the determined semantic alternative electronic text has a different textual length than the targeted electronic text content, and for replacing the targeted electronic text content displayed by the e-reader device with the determined semantic alternative electronic text content.

22 Claims, 11 Drawing Sheets

U.S. PATENT DOCUMENTS

| | | | |
|---|---|---|---|
| 2011/0239110 A1* | 9/2011 | Garrett et al. | 715/256 |
| 2011/0313756 A1* | 12/2011 | Connor | 704/9 |
| 2012/0084736 A1* | 4/2012 | Sirpal | 715/863 |
| 2012/0178073 A1* | 7/2012 | Wasmund | 434/362 |

OTHER PUBLICATIONS

Mishra, Inventions on Improving Visibility of GUI Elements a Triz based Analysis, Google 2006, pp. 1-12.*

Rauch, Mobile Documentation: Usability Guidelines, and Considerations for Providing Documentation on Kindle, Tablets, and Smartphones, IEEE 2011, pp. 1-13.*

Drewing et al., Integration of Force and Position Cues for Shapes Perception through Active Touch, Google 2005, pp. 92-100.*

Tomonari Kamba et al., "Using small screen space more efficiently," http://sigchi.org/chi96/proceedings/papers/Kamba/tk_txt.htm, printed Jun. 12, 2009, 11 pages.

Xianjun Meng et al., "Semantic feature reduction in chinese document clustering," IEEE International Conference on Systems, Man and Cybernetics, 2008, SMC 2008, Oct. 12-15, 2008, pp. 3721-3726, http://ieeexplore.ieee.org/search/freesrchabstract.jsp?arnumber=4811878&isnumber=4811..., printed Jun. 12, 2009, 1 page.

Phivos Mylonas et al., "Semantic representation of multimedia content: Knowledge representation and semantic indexing," Multimedia Tools and Applications, vol. 39, No. 3, Sep. 2008, http://www.sprinterlink.com/content/56t2507731114471/, printed Jun. 12, 2009, 10 pages.

Chengyuan Peng et al., "Text Adaptation for Mobile Digital Teletext," IEEE/WIC/ACM International Conference on Web Intelligence, 2004, WI 2004, Sep. 20-24, 2004, pp. 453-456, http://ieeexplore.ieee.org/xpl/freeabs_all.jsp?arnumber=1410842, printed Jun. 12, 2009, 1 page.

Gerard Salton et al., "Automatic Analysis, Theme Generation, and Summarization of Machine-Readable Texts," Science, vol. 264, No. 5164, pp. 1421-1426, Jun. 3, 1994, http://www.sciencemag.org/cgi/content/abstract/264/5164/1421, printed Jun. 12, 2009, 1 page.

S. Tsuchiya et al., "A Semantic Information Retrieval Technique and an Evaluation for a Narrow Display Based on an Association Mechanism," International Conference on Natural Language Processing and Knowledge Engineering, 2007, NLP-KE 2007, Aug. 30, 2007-Sep. 1, 2007, pp. 209-214, http://ieeexplore.ieee.org/xpl/freeabs_all.jsp?arnumber=4368035, printed Jun. 12, 2009, 1 page.

* cited by examiner

E-READER SEMANTIC TEXT MANIPULATION

FIELD OF THE DISCLOSURE

The present disclosure relates to enhancing the readability of text displayed by electronic reader, or e-reader, devices having limited display screen space.

BACKGROUND

Reading sessions involving electronic books, or e-books, have grown in popularity, and the electronic nature of the e-book experience presents new opportunities and challenges as the frontier of e-book technology advances. Many of the new opportunities and challenges pertain to enhancing the e-book reading experience.

An e-book is an electronic version of a traditional print book that can be read by using an electronic reader, or e-reader, device. E-reader functionality for reading e-books is in part provided by an e-reader device having a display for displaying text and graphics and a control input for receiving user input to manipulate e-book pages. Some modern e-reader devices include a touch screen display that is useable as both a control input and a display.

E-reader functionality may be provided on a dedicated e-reader device such as an Amazon.com Kindle™ or Barnes & Noble Nook™, or provided as an additional function of a communication device, such as a mobile telephone, a personal digital assistant, a personal computer, or the like. Any device that provides e-reader functionality is rendered an e-reader device. A present example of a mobile telephone device that may be rendered as an e-reader device is the iPhone™ smart phone, which is presently manufactured by Apple, Inc. of Cupertino, Calif. For example, an e-reader software application running on the iPhone™ renders the iPhone™ an e-reader device. A presently available e-reader software application is Stanza provided by Lexcycle LLC, which is presently owned by Amazon.com.

In operation, e-book content is downloaded to the e-reader device and then displayed as text and/or graphics, generally on a page by page basis. For example, e-reader devices provide user interfaces that are used to virtually turn pages and provide input for searching and requesting particular e-book content. Once a page is read, the user can instruct the e-reader device to present the next page, and so on and so forth. In response to a search query, content or pages responsive to the query are presented. Moreover, an e-reader device typically has wireless connectivity for downloading content and conducting other Web-based tasks such as browsing the Internet and receiving email.

One problem facing users of mobile devices rendered as e-reader devices is that mobile devices tend to include display screens having limited space for presenting content such as text. For the purpose of this disclosure, a text can be a letter, a word, a phrase, a sentence, a paragraph, a chapter, and combinations thereof. Touch screen gesture techniques or buttons associated with controlling such e-reader devices are useable to zoom in and out on sections of text or to scroll through sections of text. However, it is easy for a user of an e-reader device to lose his or her reading place while zooming or scrolling text. Moreover, zooming and scrolling activities do little to assist the user's understanding of the text being displayed. Thus, a need exists for systems and methods that allow users of e-reader devices to have more control over the presentation of text such that the readability of the text is enhanced. One such enhancement could limit the opportunity to lose one's reading place while also increasing the understandability of the text. Another enhancement would maximize the output of an e-reader display.

SUMMARY

The present disclosure addresses the need for users of electronic reader, or e-reader, devices to have more control over the presentation of text by enabling a user of an e-reader device to semantically alter text displayed on the e-reader device. In one embodiment, an e-reader device is provided with controls that are useable to replace displayable text with a semantic equivalent replacement that requires less display screen space. Another embodiment provides e-reader device controls that are useable by the user of the e-reader device to expand displayable text to present the user with a more in-depth or detailed semantic replacement for the given text.

Yet another embodiment provides e-reader device controls that are useable by the user of the e-reader device to replace displayable text with semantically relevant alternatives based upon the user's preferences. In this embodiment, a configurable semantic user profile is useable by the e-reader device to suggest or automatically provide a semantic text reduction or expansion for a text of interest. Moreover, the semantic user profile can also be configured to suggest or automatically replace text with a more in-depth or detailed replacement text. Further still, preconfigured semantic user profiles may be provided along with content to provide the user with a variety of predetermined semantic options to choose from. In addition, semantic user profiles are preferably aggregated from collaborating e-reader users and are then shared between the collaborating e-reader users. Aggregated and shared semantic profiles may be particularly useful in educational settings, wherein teachers and students can interact locally or remotely while reviewing common content.

Preferred embodiments of the present systems and methods employ e-reader devices having touch screens that capture touch screen gesture techniques that allow a user to semantically manipulate text using their fingers. For example, a finger pinch gesture is useable for semantic text reduction, whereas a gesture that moves fingers apart is useable for semantic text expansion. Moreover, the e-reader devices preferably have communication interfaces for communicating with remote servers.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
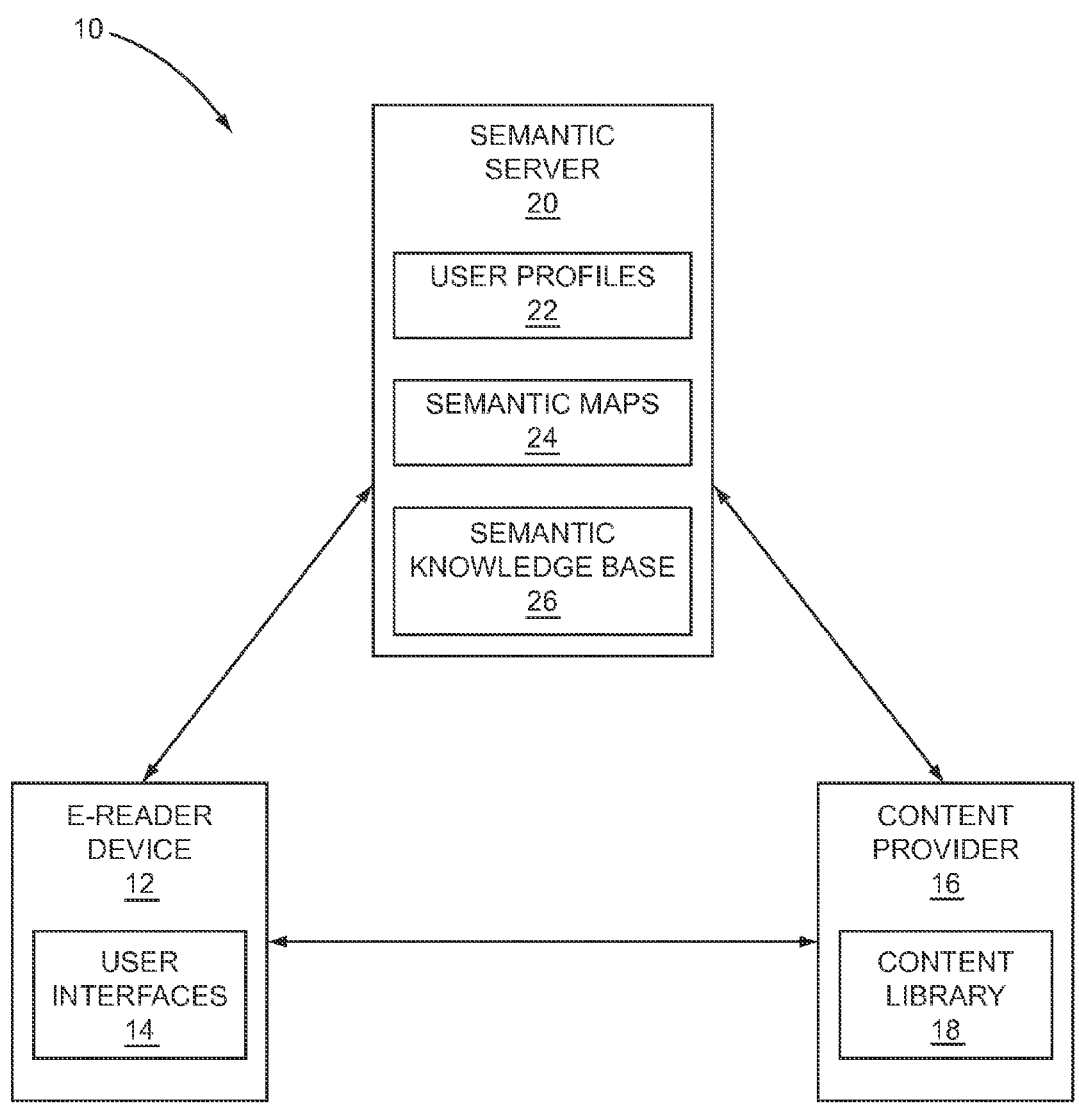
FIG. 1 is a block diagram representing one embodiment of the present systems.

FIG. 1 is a block diagram representing an electronic reader, or e-reader, semantic text processing system 10 (hereinafter the "system 10") according to the present disclosure. The system 10 includes an e-reader device 12 having user interfaces 14 for receiving user input and for presenting content to a user of the e-reader device 12 that is provided by a content provider 16, which includes a content library 18 having electronic books, or e-books, and the like.

The system 10 also includes a semantic server 20 that interacts with either or both the e-reader device 12 and the content provider 16 to provide the e-reader device 12 with alternate semantic versions of the content provided by the content provider 16. The semantic server 20 maintains user profiles 22 that are configurable by users and others to provide custom settings for governing how content is semantically presented to the users. Semantic maps 24 are useable to organize semantic alternatives. A semantic knowledge base 26 is useable to generate the semantic maps 24 in accordance with the user profiles 22.

Note that parts of the system 10, such as the semantic knowledge base 26, may be provided by or harvested from third-party services such as Wikipedia, which is presently a free online encyclopedia. Moreover, an Internet based cloud service that is deliverable and consumable in real-time may be employed to store the user profiles 22. Further still, the functionality of the semantic server 20 could be provided on the e-reader device 12 provided that the e-reader device 12 includes enough memory to store content together with an e-reader application and an application that provides the functionality of the semantic server 20. Alternately, the functionality of the semantic server 20 may be incorporated with the content provider 16.

Figure 2:
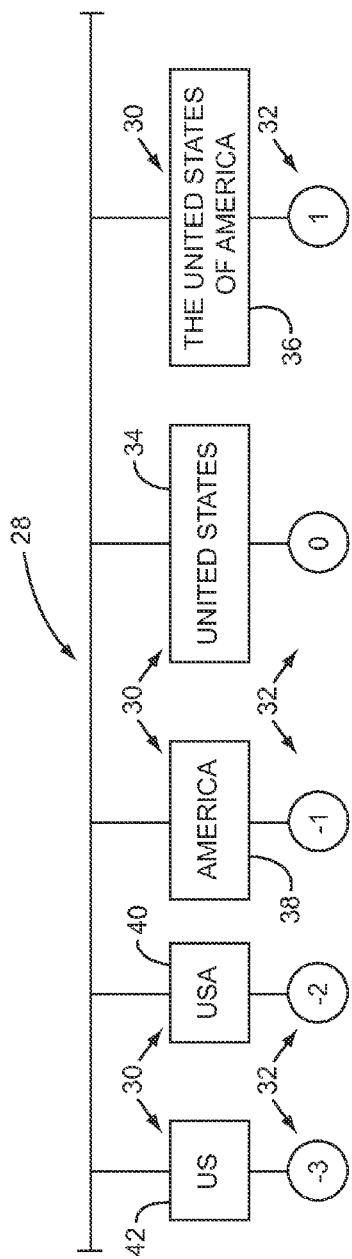
FIG. 2 is a semantic map according to one embodiment of the present systems and methods.

FIG. 2 represents a semantic map 28 according to the present disclosure. Semantic alternatives of e-reader content may be generated based upon semantic maps like the semantic map 28, which provide an association of target content (e.g., a word, a phrase, a page, a chapter, etc.) with a collection of semantically relevant alternative content 30 (hereinafter "alternative content 30"). A scale factor 32 generally describes the degree of expansion or reduction the alternative content 30 is with respect to the target e-reader content. Semantic alternatives useable for reduction have scale factors that are less than the scale factor 32 for the targeted content. In contrast, semantic alternatives useable for expansion have scale factors that are greater than the scale factor 32 for the targeted content.

As shown in the following example, content targeted for replacement is typically given a numeric value of zero as shown in the circle representing the scale factor 32 associated with the text "United States" in box 34. In this case, "United States" in the box 34 has a longer and more detailed semantic alternative, namely "The United States of America" in box 36. Moreover, "America" in box 38, "USA" in box 40, and "US" in box 42 are each shorter and more concise alternatives to the targeted text "United States" in the box 34. The numeric value of each scale factor 32 associated with each alternative content 30 represents a degree of expansion or reduction in comparison with the target content, which in this case is "United States" in the box 34.

An e-reader application executed on the user's e-reader device 12 (FIG. 1) can use the numeric values of the scale factor 32 to "slide" a current state of the user's view of the target content up or down in scale. In a particular case represented in FIG. 2, the user might select to expand the target content "America" in the box 38. Accordingly, the first level of expansion would be "United States" in the box 34 with the next level of expansion being "The United States of America" in the box 36.

Figure 3:
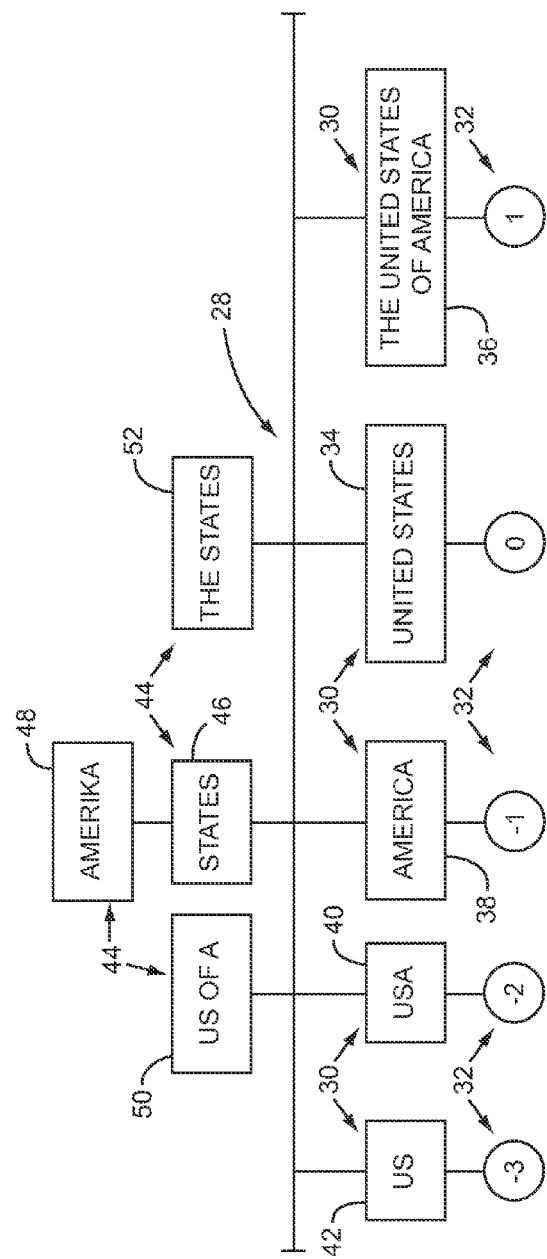
FIG. 3 is a semantic map according to another embodiment of the present systems and methods.

FIG. 3 represents a further development of the semantic map 28 of FIG. 2. In particular, customized semantic content alternatives 44 are provided in addition to the alternative content 30. The customized content alternatives 44 are typically lesser used, colloquial, or regional variations of targeted content, whereas the collection of the semantically relevant alternative content 30 is typically a more commonly used or baseline version of the targeted content. As an example, a user of the e-reader device 12 (FIG. 1) might select a variation of the target content "America" in the box 38. In this case, the user's selection of one of the customized semantic alternatives 44 could be "States" in box 46 or "Amerika" in box 48. In another example, a user may choose to replace each occurrence of the target content "USA" in the box 40 found in an e-book about the Olympics with a more patriotic feeling "US of A" in box 50. Moreover, an expatriate may choose to replace all occurrences of the target content "United States" in the box 34 in an electronic newspaper with "The States" in box 52.

While the examples above illustrate the utility of a relatively simple semantic map such as the semantic map 28, the semantic maps 24 of FIG. 1 are not limited to simple terms and phrases. For example, summarization techniques and term extraction processes are usable to generate semantic maps for larger grained content such as paragraphs and pages. In this way, content targeted for semantic replacement can be made up of a plurality of content such as e-book pages, etc.

The semantic maps 24 may also include references to remotely located alternative content 30. For example, a semantic map may reference alternative content 30 via a uniform resource locator like "http://semanticserver.com/123456" as opposed to a local alternative content 30 such as "The United States Of America" in the box 36 depicted in FIGS. 2 and 3.

An advantage of referencing remotely located semantically relevant alternative content 30 is captured by the ability to incorporate dynamic semantic alternatives. For example, the term swine flu is also referred to as the H1N1 flu strain. Since the designation of terms such as H1N1 for the swine flu may appear in the public domain after a semantic knowledge base has been established, the ability to reference such terms remotely is advantageous.

The alternative content 30 may also include references to the semantic server 20 (FIG. 1) in order to semantically process on demand content targeted for semantic replacement rather than pre-computing a numeric value for the scale factor 32. An example of such a reference is 1=http://semanticserver.com/? text="United States Of America"&level=1. The semantic server 20 may receive a request for semantically relevant information and determine the appropriate alternative content 30 based upon the request for semantically relevant information.

The semantic maps 24 may also be shared among users having their own e-reader devices such as the e-reader device 12. Typically, the semantic maps 24 are retrieved from the semantic server 20 or from a local storage memory on the e-reader device 12. As an additional option, the user of the e-reader device 12 can obtain the semantic maps 24 from proximal e-reader devices via a local area network or from other remote e-reader devices in communication with the e-reader device 12 via a wide area network such as the Internet.

The user of the e-reader device 12 may initiate the sharing of the semantic maps 24 during a collaborative document viewing session between multiple e-reader devices (e.g., a business meeting, a teacher with students, a book club, etc). During such sessions, semantic map collaboration rules are useable to determine how the semantic maps 24 are used. In one embodiment, at least one of the semantic map collaboration rules calls for the aggregation of the semantic maps 24 so that a resultant collaborative semantic map is available for all the users in a collaborative document viewing session.

The semantic map collaboration rules are also usable to determine which users are allowed to perform collaborative viewing operations such as page turning and skipping, as well as text zooming, etc. The semantic map collaboration rules are also configurable to determine which of the e-reader devices in a collaborative document viewing session operate as a master e-reader device and which operate as slave e-reader devices. For example, only the user of the master e-reader device can dictate how semantic replacements for content targeted to be semantically modified can be conducted.

As another option, the processing of the semantic map collaboration rules can yield a selection of a particular user (e.g., a master e-reader device user) as the arbiter for determining which of the semantic maps 24 are useable. For example, by way of the semantic map collaboration rules, the master can choose which of the users can provide semantic maps 24, and so forth. Yet another option allows a representative of one of the user profiles 22 to be selected as a representative profile to be used by the users in the collaborative document viewing session. In this way, the representative user profile is used to retrieve various ones of the semantic maps 24 according to the representative user profile.

Figure 4:
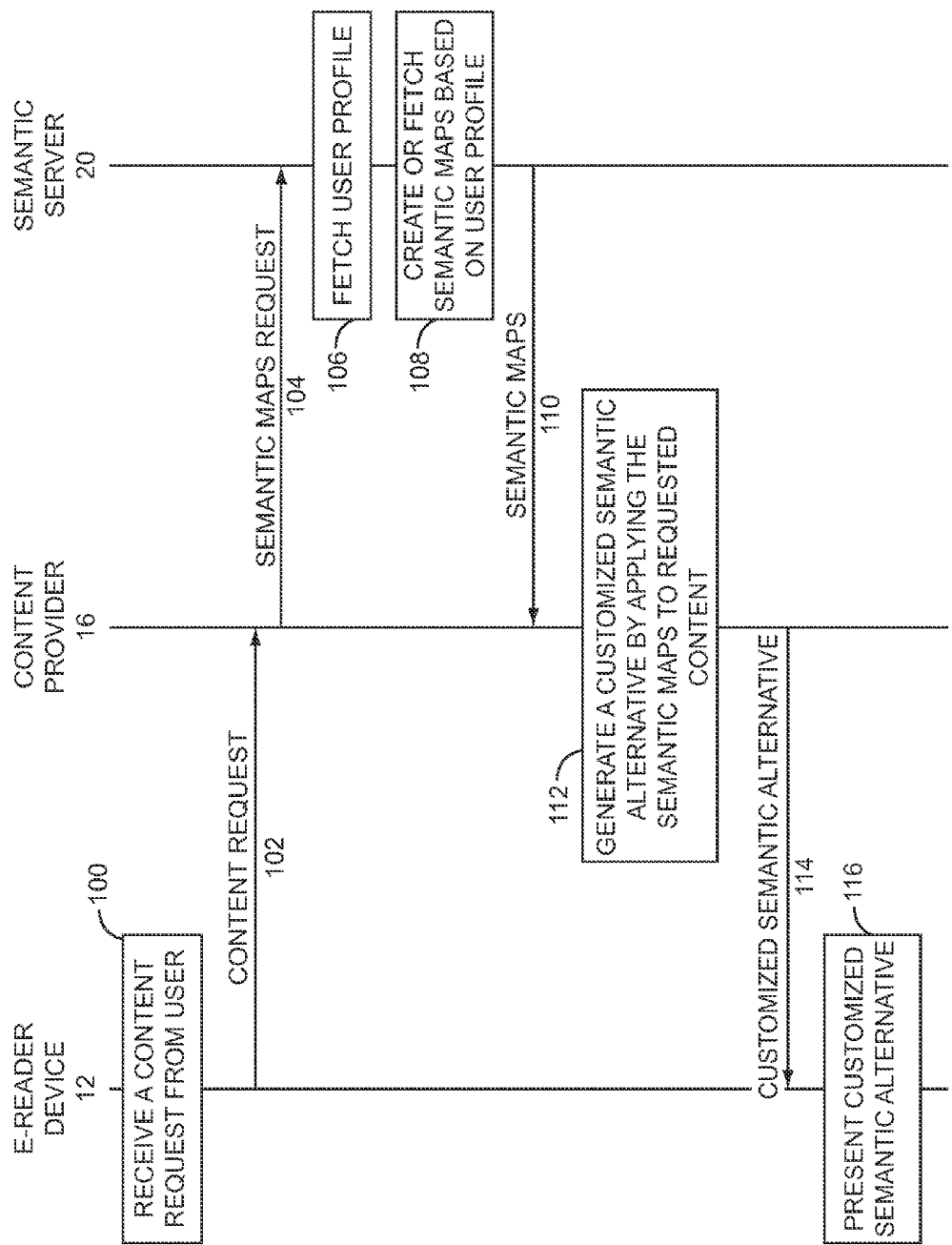
FIG. 4 is a flow diagram depicting a process for semantically altering text according to one embodiment of the present systems and methods.

FIG. 4 illustrates how the content provider 16 receives a request for content and processes the request using semantic replacements. It is to be understood that the e-reader device 12 can include the semantic server 20 and the content provider 16 as long as the e-reader device 12 has enough memory and processor power to store data pertaining to the content provider 16 as well as execute the semantic server 20.

The process begins when the e-reader device 12 receives a content request from the user (step 100). The content request is then sent to the content provider 16 (step 102). The content provider 16 in turn sends a semantic maps request to the semantic server 20 (step 104). In response, the semantic server 20 fetches an appropriate user profile from the user profiles 22 (step 106). Next, semantic maps 24 are created or fetched based upon the fetched user profile (step 108). The fetched user profile from the user profiles 22 may include the user's geographic location as well as the user's demographic information, thereby allowing the creation of geographic and demographically relevant versions of semantic maps 24. The semantic maps 24 are then sent to the content provider 16 (step 110), where a customized semantic alternative 44 is generated by applying the semantic maps 24 to the requested content (step 112). The customized semantic alternative 44 is then sent to the e-reader device 12 (step 114), where it is presented to the user (step 116).

In situations in which the user does not yet have a user profile or a user profile with enough affinity to the content being requested, the semantic server 20 may provide a selection of predetermined user profiles to choose from. For example, if the content provider 16 receives a request for a particular type of electronic text content such as legal related content and the user's profile does not have any semantic update history related to legal content, the semantic server 20 may provide a user profile or partial user profile derived from user profiles aggregated from users that belong to a particular group, such as the user's social network, that is relevant to legal content. Further still, if the content provider 16 receives a request for popular content, the semantic server 20 can be programmed to automatically select a user profile that is particularly applicable to the popular content. Moreover, a particular interest group such as an author, a publisher, or an e-book community can provide a set of user profiles for a particular e-book. Other user profiles can be provided based on demographics such as the user's education level or gender, etc.

The semantic server 20 may be programmable to select the most popular and/or relevant semantic maps 24 based upon the user's similarity with other users that have previously established user profiles. The similarity between users can be a function of demographics, wherein demographic data such as age, residence, and gender are useable by the semantic server 20 while processing a semantic maps request. In one aspect, the semantic maps request processing results in fetching all of a group of semantic maps 24 associated with particular content being requested by the user.

In another aspect, the semantic maps request processing results in pre-fetching semantic maps 24 that the user would likely want to use. In this case, the semantic server 20 is programmable to perform probability calculations on statistical data associated with the user's historical use of particular semantic maps 24. In this case, the content provider 16 may apply semantic maps 24 to the requested content based upon the user's history to create a set of instructions for the e-reader device 12 to follow during presentation of the requested content. In this way, customized semantic alternatives 44 for the requested content will be presented to the user automatically in a way the duplicates the user's historical preferences for semantic alternatives. For example, if the user has always explicitly wanted the acronym NASA to replace the phrase National Aeronautics and Space Administration, the acronym NASA will automatically be presented everywhere the phrase National Aeronautics and Space Administration is located within requested content. Preferably, automatic semantic replacements are presented with a different color font or background, etc. such that the user understands semantic replacements are present in place of the original text. In addition, the semantic map request processing may result in pre-fetching semantic maps 24 based also on geographical location and cultural demographics. For example, an appropriate alternate content for the term "American" for a user located in the Central American country of Belize may be, but is not limited to, North American, South American, and Latin American. In such an instance, the alternative content 30 may depend both on the user's e-book content and geographical location. Further still, demographic information about the user may be used to pre-fetch semantic maps 24. For example, a user born in the 1940s will likely have a different vernacular than a person born in 1980. As a result, users from different generations may benefit from having a generation relevant set of semantic maps 24.

FIGS. 5-8 illustrate the operation of a preferred embodiment of the present disclosure from a user's perspective. In this preferred embodiment, the e-reader device 12 includes a touch screen 54 for receiving touch screen gestures that are generated by the user either through the use of a stylus or the user's digits (i.e., the user's fingers and thumb). The touch screen 54 is also used to display requested content 56 to the user. In the following example, the requested content 56 includes a target text that the user wants to have replaced with a semantic alternative text.

Figure 5:
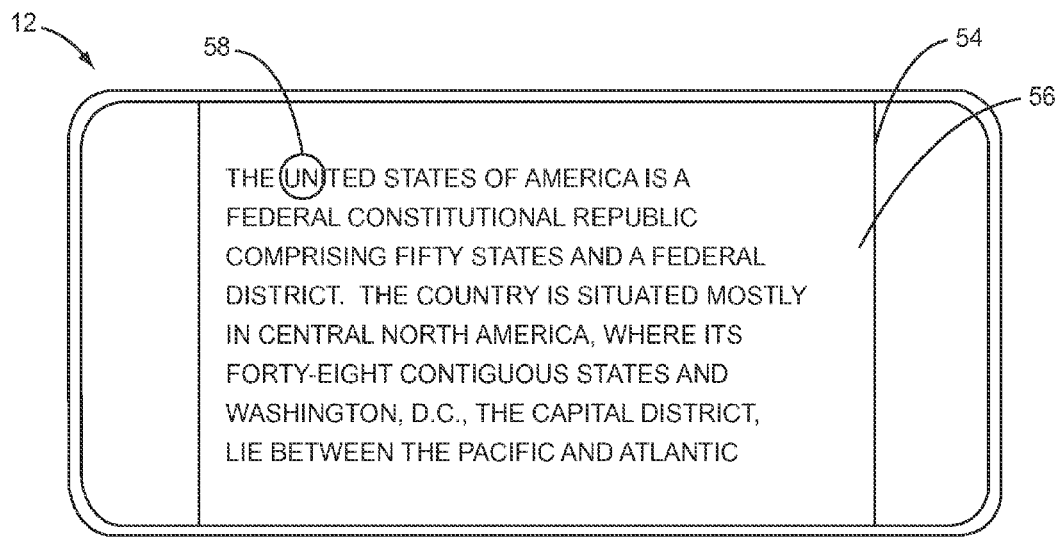
FIG. 5 depicts an electronic reader, or e-reader, device receiving a touch gesture that begins a selection of text.
Figure 6:
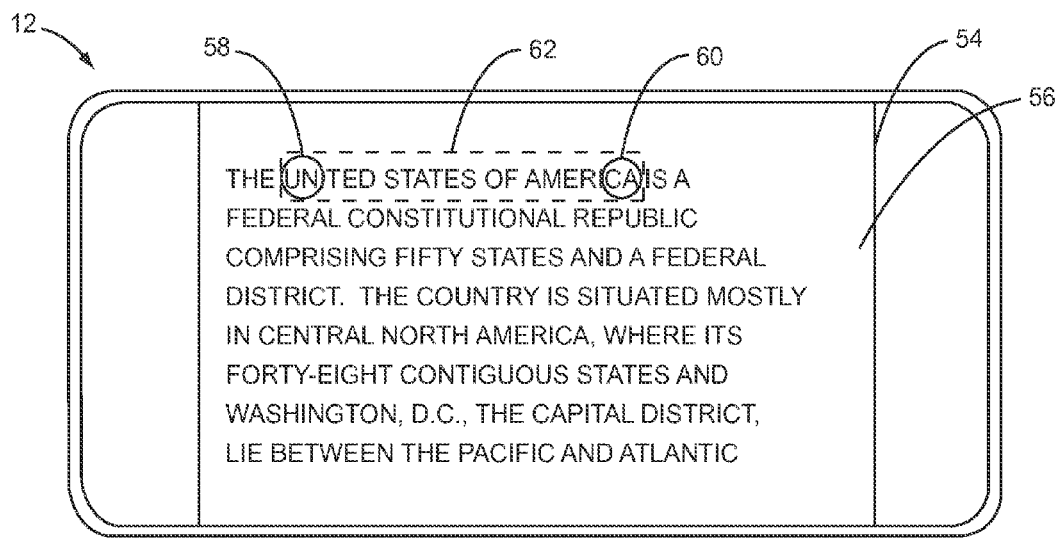
FIG. 6 depicts the completion of the text selection of FIG. 5 along with the beginning of a first pinch type touch gesture for reducing the selected text with a semantic alternative.

Beginning with FIG. 5, the user touches the touch screen 54 at a location 58 that corresponds with the word "United." Next, as shown in FIG. 6, the user drags their finger across the text "United States of America" to a location 60 where they lift their finger to indicate to the e-reader device 12 that the text between the locations 58 and 60 is targeted for replacement with the semantic alternative text. A dashed box 62 is displayed as feedback to the user to indicate the selection of the targeted text. The user then retouches the touch screen 54 at the locations 58 and 60 in preparation of performing a pinching movement to indicate that the target text of "United States of America" is to be reduced.

Figure 7:
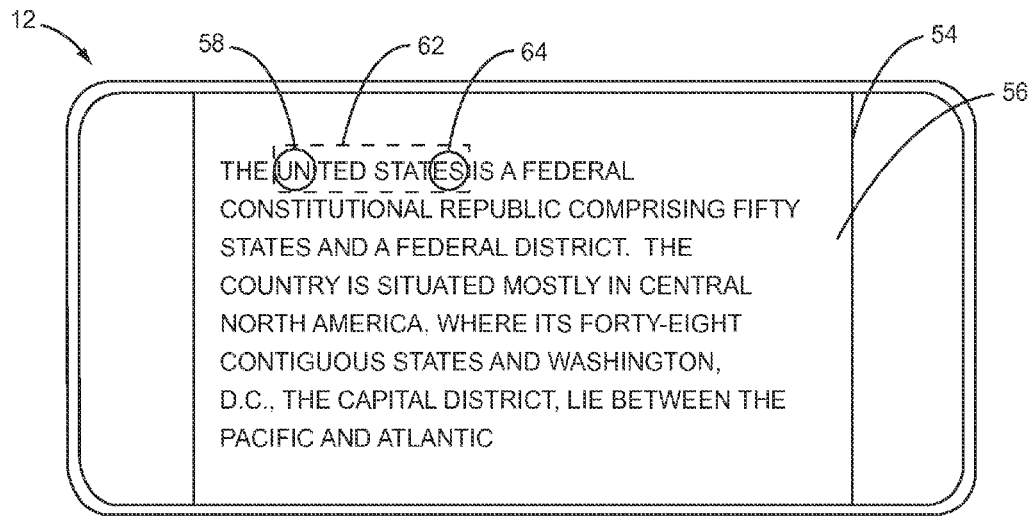
FIG. 7 depicts the touch screen result of the first pinch type touch gesture of FIG. 6.

FIG. 7 depicts the results of a pinch gesture in which the user's pinching digits have come to rest at locations 58 and 64. At this point, the processing steps illustrated in FIG. 4 have resulted in the replacement of the text "United States of America" with the shorter semantic alternative of "United States." The length of the dashed box 62 has been reduced to indicate a new target text selection being the semantic alternative "United States."

Figure 8:
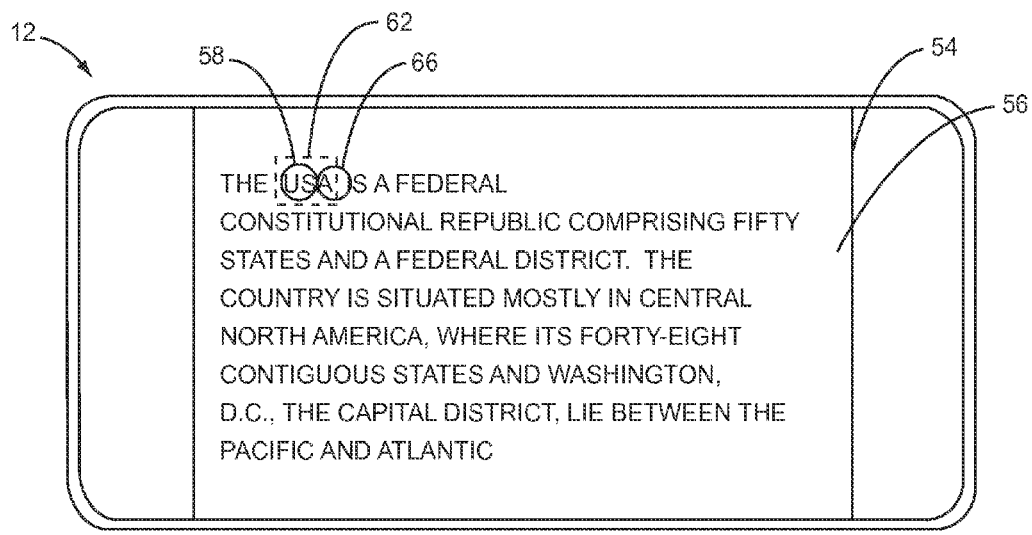
FIG. 8 depicts the touch screen result of a second pinch type touch gesture.

FIG. 8 depicts the results of a second pinch gesture in which the user's pinching digits have come to rest at locations 58 and 66. As a result, the second pinch gesture results in the replacement of the text "United States" with the shorter semantic alternative of "USA."

Figure 9:
FIG. 9 depicts a reduction symbol that signifies a reduction touch gesture selection or operation.
Figure 10:
FIG. 10 depicts an expansion symbol that signifies an expansion gesture selection or operation.
Figure 11:
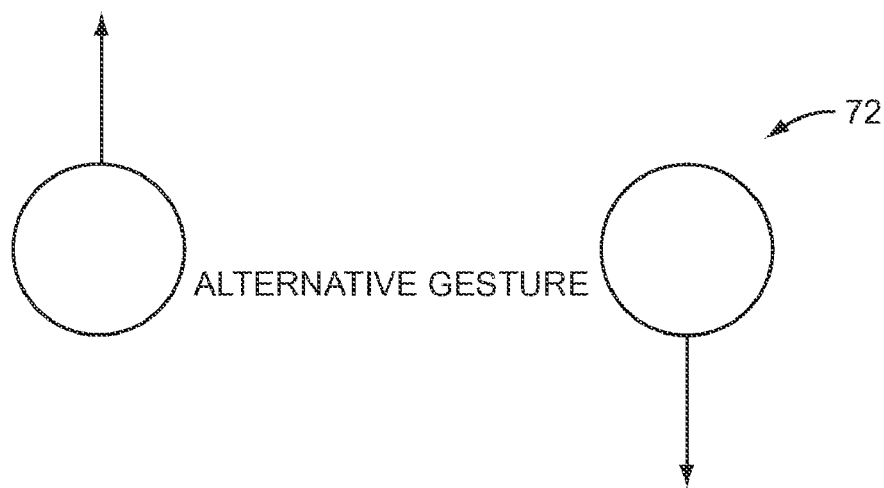
FIG. 11 depicts an alternative symbol that signifies a customizable alternative gesture selection or operation.

FIGS. 9-11 illustrate several touch gestures useable with the present disclosure including the pinch gesture used in FIGS. 6 and 7. From the viewpoint of the user, these touch gestures are used to semantically manipulate content displayed on the touch screen 54 (FIGS. 5-8). In the examples that follow, screen touches are represented by circles and touch movements, including the directions of the movements, are represented by arrows.

Figure 16:
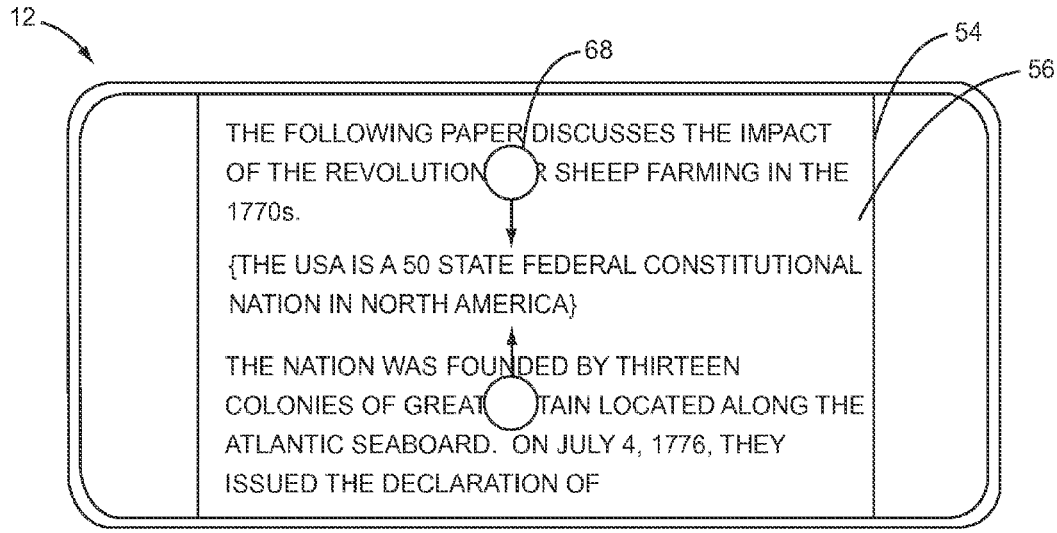
FIG. 16 illustrates the action of a first pinch gesture.
Figure 17:
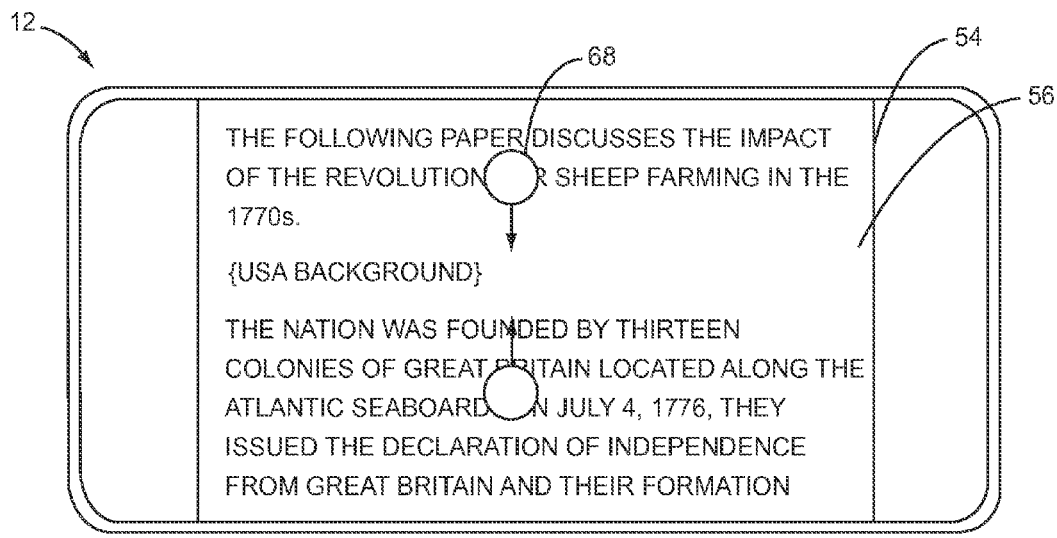
FIG. 17 illustrates the action of a second pinch gesture.

FIG. 9 depicts a pinch or reduction gesture symbol 68 that represents the pinch touch gesture operationally illustrated in FIGS. 6 and 7 to reduce the text phrase "United States of America" down to the text "USA." In general terms, the reduction gesture of FIG. 9 is useable to request semantic alternatives that require less space on the touch screen 54. In other words, the reduction gesture is useable to request semantic alternatives that are made up of fewer letters than text targeted for a semantic replacement. While the reduction gesture symbol 68 is shown in FIG. 9 in a horizontal setting for reducing smaller scope content such as a phrase, other orientations for the reduction gesture symbol 68 and the pinch gesture it represents are also available. For example, a vertical orientation of the reduction gesture symbol 68 represents a pinch gesture that is appliable to larger scope content such as paragraphs. An example using a reduction gesture represented by a vertically oriented reduction gesture symbol 68 is shown in FIGS. 16 and 17.

FIG. 10 depicts an expansion gesture symbol 70 that represents an expansion touch gesture that is useable to request semantic alternatives that provide a more in depth or detailed semantic replacement for text targeted for replacement. For example, if the user chooses the text "NASA" for expansion, the expanded semantic alternative would be "National Aeronautics and Space Administration." While the expansion gesture symbol 70 is shown in FIG. 10 in a horizontal setting for expanded a word, acronym, or phrase, it is important to note that other orientations for the expansion gesture symbol 70 and the expansion gesture it represents are also available. For example, a vertical orientation of the expansion gesture symbol 70 represents an expansion gesture that is appliable to larger scope content such as paragraphs.

FIG. 11 depicts an alternative gesture symbol 72 that represents an alternative touch gesture that can be user defined to request a custom function for semantic content manipulation. Note that the alternative touch gesture represented by the alternative gesture symbol 72 or any of the other touch gestures can be defined with distance and timing thresholds. In this way, the user's progression of a touch gesture can be interpreted as multiple semantic manipulation requests. For example, a user could select targeted content by touch gesturing a touch screen 54 having pixels. The user could initiate a first reduction of the target content by moving their fingers 25 pixels together. After this first reduction, the user would typically pause before continuing to move their fingers together for another 25 pixels to achieve a second reduction of the target content.

Applying a semantic manipulation using touch gestures like those represented by the gesture symbols 68, 70, and 72 generally replaces the targeted content with the semantically relevant alternative content 30 obtained from a semantic map such as the semantic map 28 of FIGS. 2 and 3. The e-reader device 12 (FIGS. 1 and 5-8) may emphasize the semantically relevant alternative content 30 with an animation, a highlighting, an audio sound, a change in font, a change in font color, a change in background color or shading, and the like.

Figure 12:
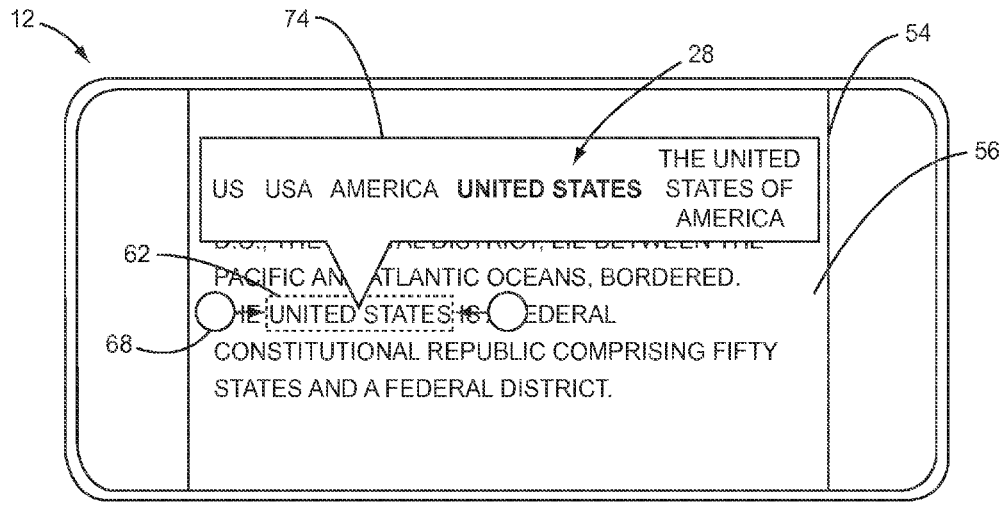
FIG. 12 depicts the display of an e-reader device presenting a semantic tag cloud.

FIG. 12 depicts the e-reader device 12 presenting a semantic map tag cloud 74 for the user to use as a menu for selecting a desirable semantic alternative while a touch gesture is in progress. For example, as the user is performing a gesture represented by the reduction gesture symbol 68, the semantic map tag cloud 74 is presented to the user showing a visualization of a semantic map such as the semantic map 28. Moreover, the semantic map cloud tag 74 can include an emphasis such as the bolded text "United States" to provide feedback to the user as to the original version of the content, the targeted content, and the current alternative content that will be used when the user releases the gesture, which in this case is represented by the reduction gesture symbol 68.

Figure 13:
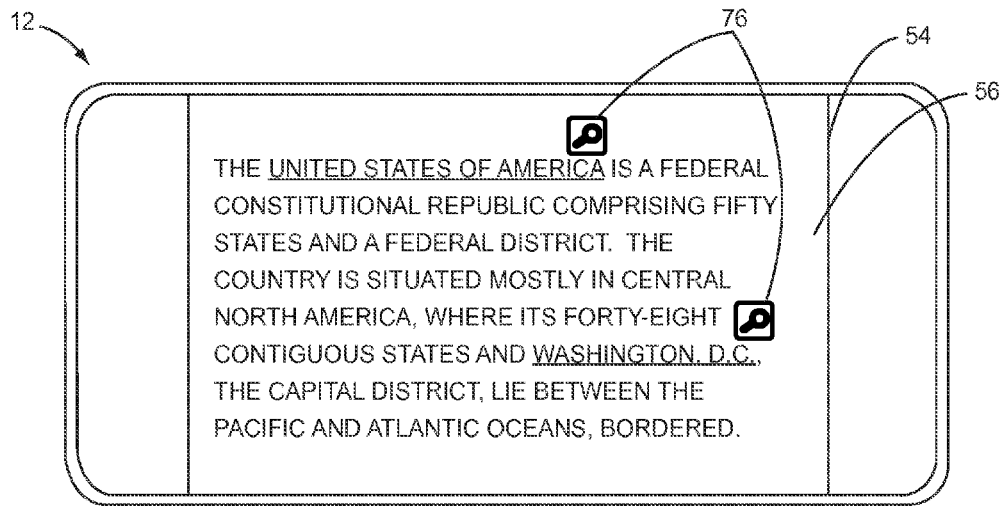
FIG. 13 depicts the display of an e-reader device presenting icons used as indicators to show which content is eligible for semantic alternative replacement.

FIG. 13 depicts the e-reader device 12 presenting indicators such as icons 76 that are displayable near content that is eligible for semantic alternative replacement by way of semantic manipulation. Other indicators for informing the user of which content is available for semantic manipulation can be, but are not limited to, changing the appearance of the eligible content by underlining, highlighting, changing the color of the font, changing the background color, and combinations thereof. Moreover, the indicators may include representations that emphasize which manipulations are popular or have been performed by others in a collaborative document viewing session, etc. Further still, the indicators may also show to the user the type of touch gesturing that is available to semantically manipulate content.

FIGS. 14-17 illustrate an example of using touch gesturing to semantically manipulate the requested content 56 displayed on the touch screen 54 of the e-reader device 12. The goal of the example is to reduce the overall size of the requested content 56 through summarization.

Figure 14:
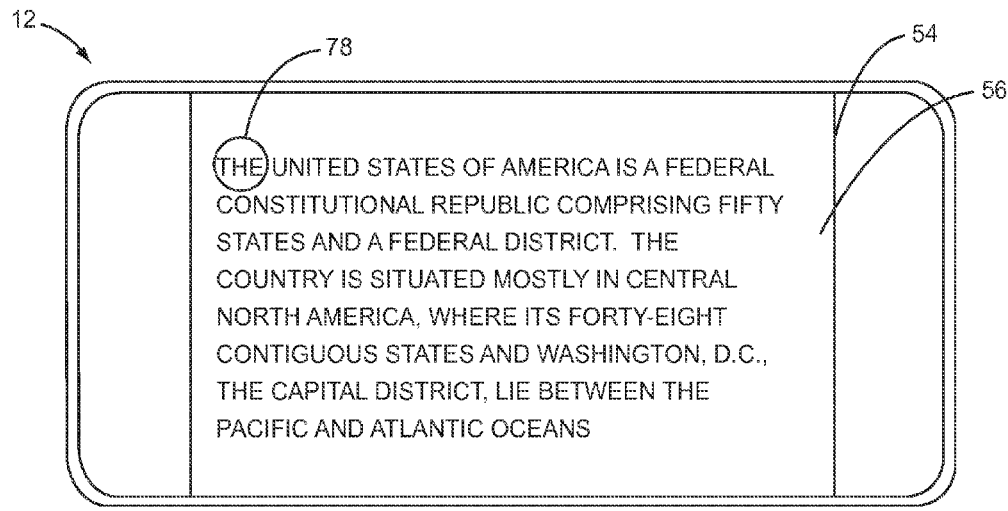
FIG. 14 depicts the touch screen display of an e-reader device, wherein a user has initiated a targeted text selection.
Figure 15:
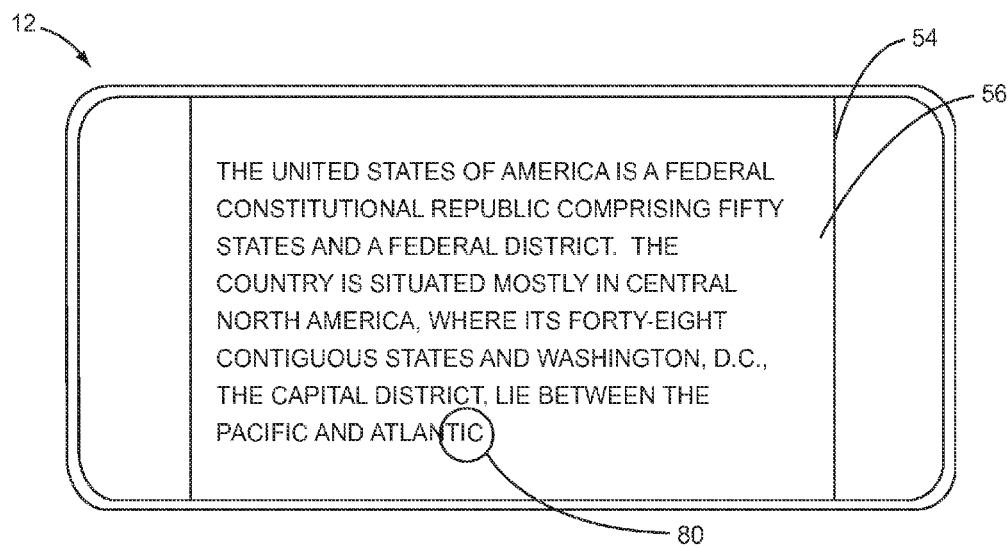
FIG. 15 depicts the touch screen display of an e-reader device, wherein the user has completed the targeted text selection.

Beginning with FIG. 14, the user touches the touch screen 54 at a location 78 that corresponds with the word "The." Next, as shown in FIG. 15, the user drags their finger down and across the touch screen 54 to a location 80 that corresponds to the word "Atlantic." In this way, the content between and including the locations 78 and 80 is selected for semantic manipulation.

FIG. 16 illustrates the action of a first pinch gesture represented by the reduction gesture symbol 68. The result of the first pinch gesture is a first level of summarization for the selected content, which is displayed by the e-reader device 12 on the touch screen 54. FIG. 17 illustrates the action of a second pinch gesture represented by the reduction gesture symbol 68. The result of the second pinch gesture is a second level of summarization for the selected content, which is displayed by the e-reader device 12 on the touch screen 54.

The e-reader device 12 may also be programmed to suggest shortcuts for performing the selection. For example, when the e-reader device 12 detects a user selecting a selection of content, the e-reader device 12 can display unobtrusive indicators associated with various scopes of content such as, but not limited to paragraphs, pages, chapters, and combinations thereof. The suggested shortcuts may be performed by comparing a current selection against previously selected portions of content for displayed content such as the requested content 56. The previous selected portions of the requested content 56 can be selections made by a current user, demographically similar users, popular content selections, and so and so forth.

A selection may be based on semantic analysis of the content. For example, the e-reader device 12 is programmable to statistically determine whether or not the user is likely going to select an entire paragraph as opposed to a single word, phrase, or sentence.

Figure 18:
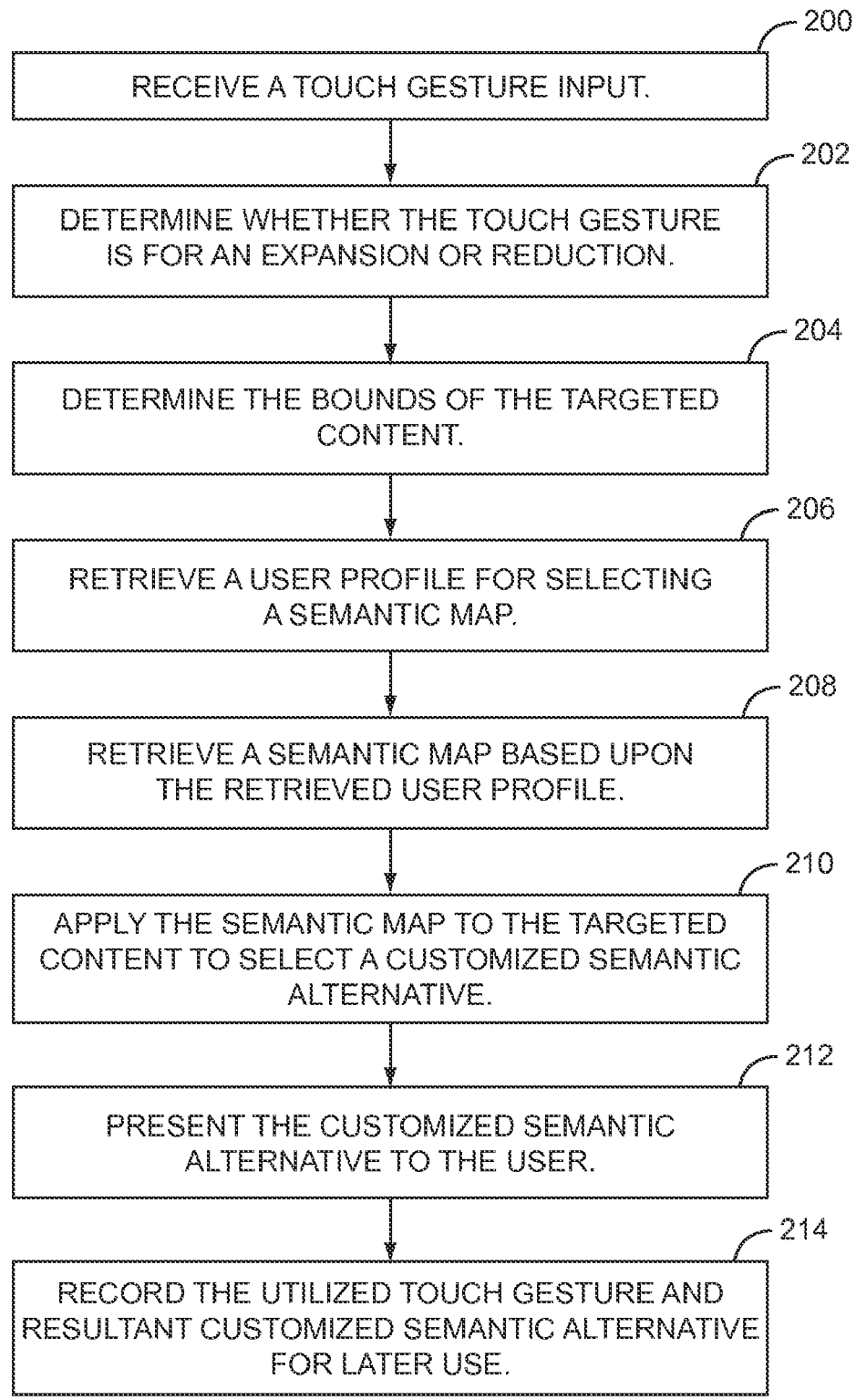
FIG. 18 is a flow chart showing the steps executed by the e-reader device in concert with the semantic server.

FIG. 18 depicts a flow chart illustrating the steps the e-reader device 12, in concert with the semantic server 20, executes to perform a semantic text replacement like those illustrated in FIGS. 5-8. For this example, assume that the e-reader device 12 includes sufficient memory and processing power such that the semantic server 20 can be implemented on the e-reader device 12.

The process starts when a touch gesture is received by the e-reader device 12 (step 200). Next, an application running on the e-reader device 12 determines whether the received touch gesture represents a request for a content reduction or a request for content expansion (step 202). The selected content targeted for replacement by a semantic alternative is then determined by resolving the user's touch locations at the instant of touch release (step 204). Once the targeted content is determined, a user profile appropriate for the targeted content is selected (step 206). Next, the user profile is used to retrieve an appropriate semantic map for the targeted content (step 208). The semantic map is then applied to the targeted content to select a customized semantic alternative 44 (step 210). Next, the customized semantic alternative 44 is presented to the user, typically via the touch screen 54 of the e-reader device 12 (step 212). The user's touch gesture and selected customized semantic alternative 44 is then recorded by the e-reader device 12 for a later use (step 214).

Recordings like those made in step 214 are particularly useful for cases in which semantically relevant alternative content 30 is first presented to the user and then cancelled by the user. For example, assume a user selects to expand the text "Kulucan." The e-reader device 12, together with the semantic server 20, responds by presenting expanded or detailed content pertaining to the Mayan god associated with the text "Kulucan." Once finished reading the expanded content, the user cancels the original expansion gesture.

It should be understood that some of the steps depicted in FIG. 18 can be reordered. For example the bounds of the targeted content determined in step 204 can proceed before step 202, which determines the touch gesture type. Moreover, recording the utilized touch gesture and resultant semantic content alternative in step 214 can proceed before step 212, which presents the semantic content alternative to the user.

Figure 19:
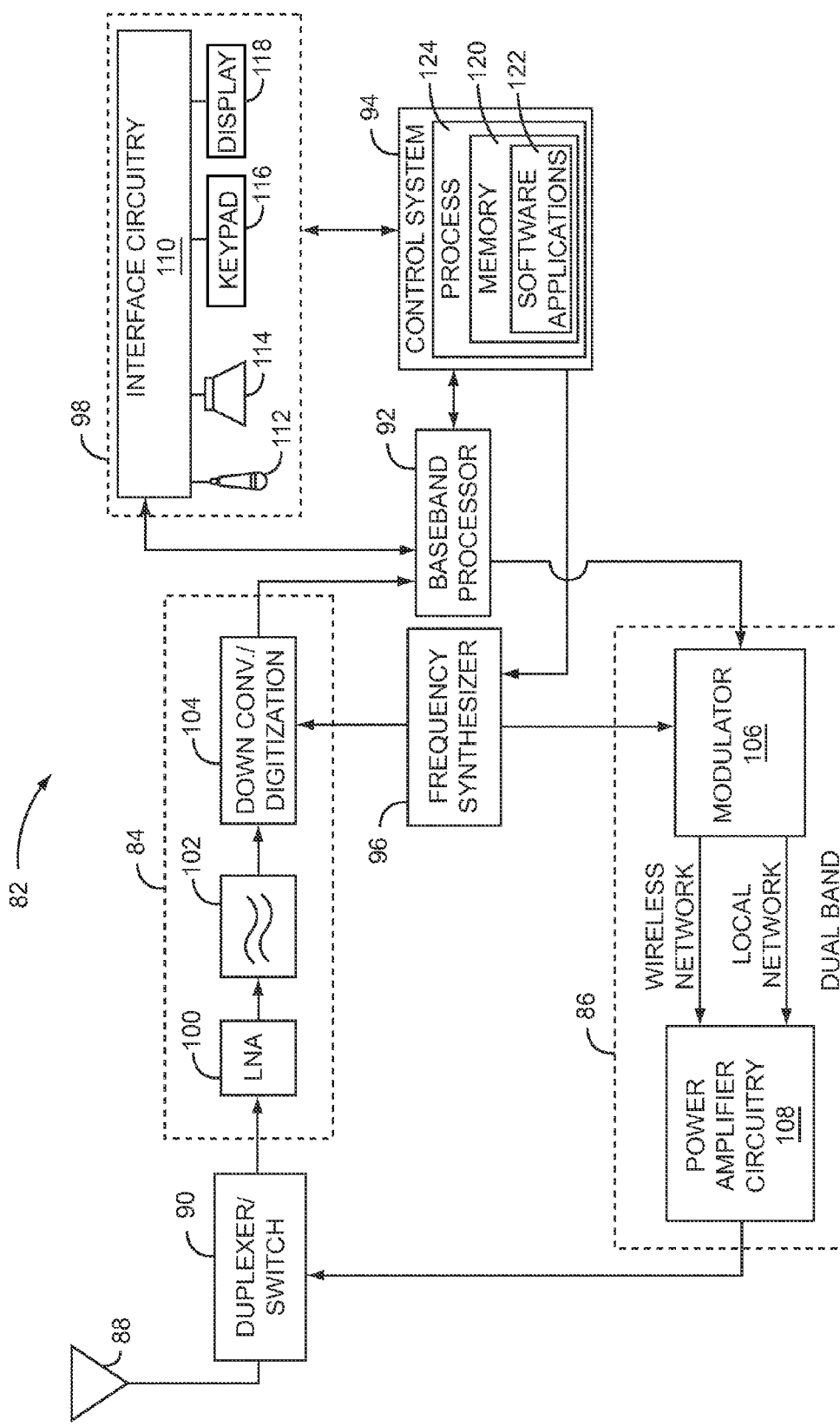
FIG. 19 is a block diagram of a wireless smart phone that can be used as an e-reader device according to embodiments of the present disclosure.

FIG. 19 depicts the basic architecture of a wireless smart phone 82 that is useable as the e-reader device 12 (FIG. 1). Moreover, the wireless smart phone 82 may also provide a communication interface for communicating with the content provider 16 (FIG. 1) and the semantic server 20 (FIG. 2), both of which may be remote from the e-reader device 12.

The wireless smart phone 82 may include a receiver front end 84, a radio frequency transmitter section 86, an antenna 88, a duplexer or switch 90, a baseband processor 92, a control system 94, a frequency synthesizer 96, and a user interface 98. The receiver front end 84 receives information bearing radio frequency signals from one or more remote transmitters provided by a base station. A low noise amplifier 100 amplifies the signal. A filter circuit 102 minimizes broadband interference in the received signal, while downconversion and digitization circuitry 104 downconverts the filtered, received signal to an intermediate or baseband frequency signal, which is then digitized into one or more digital streams. The receiver front end 84 typically uses one or more mixing frequencies generated by the frequency synthesizer 96. The baseband processor 92 processes the digitized received signal to extract the information or data bits conveyed in the received signal. This processing typically comprises demodulation, decoding, and error correction operations. As such, the baseband processor 92 is generally implemented in one or more digital signal processors (DSPs).

On the transmit side, the baseband processor 92 receives digitized data, which may represent voice, data, or control information, from the control system 94, which it encodes for transmission. The encoded data is output to the radio frequency transmitter section 86, where it is used by a modulator 106 to modulate a carrier signal that is at a desired transmit frequency. Power amplifier circuitry 108 amplifies the modulated carrier signal to a level appropriate for transmission, and delivers the amplified and modulated carrier signal to the antenna 88 through the duplexer or switch 90.

A user may interact with the wireless smart phone 82 via the user interface 98, which may include interface circuitry 110 associated with a microphone 112, a speaker 114, a physical or virtual keypad 116, and a touch screen display 118. The interface circuitry 110 typically includes analog-to-digital converters, digital-to-analog converters, amplifiers, and the like. Additionally, the interface circuitry 110 may include a voice encoder/decoder, in which case the interface circuitry 110 may communicate directly with the baseband processor 92.

The microphone 112 will typically convert audio input, such as the user's voice, into an electrical signal, which is then digitized and passed directly or indirectly to the baseband processor 92. Audio information encoded in the received signal is recovered by the baseband processor 92, and converted by the interface circuitry 110 into an analog signal suitable for driving the speaker 114. The keypad 116 and the touch screen display 118 enable the user to interact with the wireless smart phone 82, input numbers to be dialed, address book information, or the like, as well as monitor call progress information.

The control system 94 includes a memory 120 for storing data and software applications 122, and a processor 124 for running the operating system and executing the software applications 122. When the wireless smart phone 82 is used as the e-reader device 12 for reading e-books, the memory 120 will be loaded with an e-reader software application along with e-book content. Moreover, provided that the memory 120 is large enough and the processor 124 is powerful enough, an application that provides the function of the semantic server 20 could be stored in the memory of the wireless smart phone 82 and executed by the processor of the wireless smart phone 82.

Those skilled in the art will recognize improvements and modifications to the preferred embodiments of the present invention. All such improvements and modifications are considered within the scope of the concepts disclosed herein and the claims that follow.

What is claimed is:

1. A computerized method for changing a textual length of a displayable electronic text content while maintaining a meaning of the displayable electronic text content, the method comprising:

receiving, via an electronic touch screen that displays a displayable electronic text content, a multi-touch user input that identifies the displayable electronic text content targeted for a textual length change, and a textual length change indication that indicates a reduction or expansion of a textual length of the displayable electronic text content;

determining a displayable semantic alternative electronic text content for the targeted displayable electronic text content based on the textual length change indication, wherein the determined displayable semantic alternative electronic text content is different from the targeted displayable electronic text content and has a different textual length than the targeted displayable electronic text content; and effecting replacement of the targeted displayable electronic text content with the determined displayable semantic alternative electronic text content.

2. The computerized method of claim 1, wherein the textual length change indication indicates a reduction of the textual length of the targeted displayable electronic text content.

3. The computerized method of claim 2, wherein determining the displayable semantic alternative electronic text content results in a determined displayable semantic alternative electronic text content having a shorter textual length than the targeted displayable electronic text content.

4. The computerized method of claim 1, wherein the textual change indication indicates an expansion of the textual length of the targeted displayable electronic text content.

5. The computerized method of claim 4, wherein determining the displayable semantic alternative electronic text content results in a determined displayable semantic alternative electronic text content having a longer length than the targeted displayable electronic text content.

6. The computerized method of claim 1, wherein a user's fingers touch the electronic touch screen such that two digits of the user are moved towards each other in a pinching motion to request the reduction of the textual length of the displayable electronic text content targeted for the textual length change.

7. The computerized method of claim 1, wherein a user's fingers touch the electronic touch screen such that two digits of the user are moved away from each other in a motion to request the expansion of the textual length of the displayable electronic text content targeted for the textual length change.

8. The computerized method of claim 1, wherein a user's fingers touch the electronic touch screen such that two digits of the user are moved towards or away from each other to request the reduction or the expansion, respectively, of the change in the textual length of the displayable electronic text content targeted for the textual length change.

9. The computerized method of claim 1, further comprising:

identifying a user targeting the displayable electronic text content for the textual length change;

retrieving a user profile associated with the identified user; and generating semantic maps relevant to the user profile, wherein the semantic maps are usable for determining the displayable semantic alternative electronic text content for the targeted displayable electronic text content, wherein the determined displayable semantic an electronic touch screen for displaying the displayable electronic text content and for receiving a multi-touch user input that identifies a portion of the displayable electronic text content targeted for a textual length change, the multi-touch user input further comprising a textual length change indication that indicates a reduction or expansion of a textual length of the targeted displayable electronic text content; and a processor programmed to determine a displayable semantic alternative electronic text content for the targeted displayable electronic text content based on the textual length change indication and for effecting replacement of the targeted displayable electronic text content with the determined displayable semantic alternative electronic text content, wherein the determined displayable semantic alternative electronic text content is different from the targeted displayable electronic text content and has a different textual length than the targeted displayable electronic text content.

10. The computerized method of claim 9, wherein the user profile includes user preferred displayable semantic alternative electronic text content.

11. The computerized method of claim 9, wherein at least one of the semantic maps that is statistically likely to be useable by the user is pre-fetched for immediate use from an electronic memory containing the semantic maps.

12. A computerized method for reducing a textual length of a displayable electronic text content while maintaining a meaning of the displayable electronic text content, the method comprising:
 receiving, via an electronic touch screen that displays a displayable electronic text content, a multi-touch user input that identifies the displayable electronic text content targeted for a textual length change, wherein the multi-touch user input indicates two digits of a user moving towards each other in a pinching motion;
 interpreting the multi-touch user input as a request to reduce a textual length of the targeted displayable electronic text content;
 in response to the request, determining a displayable semantic alternative electronic text content for the targeted displayable electronic text content, wherein the determined displayable semantic alternative electronic text content is different from the targeted displayable electronic text content and has a shorter textual length than the targeted displayable electronic text content; and
 effecting replacement of the targeted displayable electronic text content with the determined displayable semantic alternative electronic text content.

13. An electronic reader (e-reader) device for changing a textual length of a displayable electronic text content while maintaining a meaning of the displayable electronic text content, the e-reader device comprising:
 a memory for storing a displayable electronic text content;
 length change indication that indicates a reduction or expansion of a textual length of the targeted displayable electronic text content; and
 a semantic server application stored in the memory of the e-reader device and being executable by the processor of the e-reader device to receive requests for a displayable semantic text alternative for a targeted displayable electronic text content identified by way of the e-reader device and to determine a displayable semantic alternative electronic text content for the targeted displayable electronic text content based on the textual length change indication and for effecting replacement of the targeted displayable electronic text content displayed by the e-reader device with the determined displayable semantic alternative electronic text content, wherein the determined displayable semantic alternative electronic text content is different from the targeted displayable electronic text content and has a different textual length than the targeted displayable electronic text content.

14. The e-reader device of claim 13, wherein the multi-touch user input indicates one of a user's fingers touching the electronic touch screen such that two digits of the user are moved towards each other in a pinching motion to request the reduction in the textual length of the targeted displayable electronic text content, and two digits of the user moving away from each other to request the expansion in the textual length of the targeted displayable electronic text content.

15. A system for changing a textual length of a displayable electronic text content while maintaining a meaning of the displayable electronic text content, the system comprising:
 an electronic reader (e-reader) device having a memory for storing data and applications, a processor for executing the applications, and an electronic touch screen for displaying a displayable electronic text content and for receiving a user touch gesture comprising a multi-touch user input that identifies a portion of the displayable electronic text content targeted for a textual length change, the multi-touch user input further comprising a textual alternative electronic text content has the different textual length than the targeted displayable electronic text content.

16. The system of claim 15, further including a content provider for providing the displayable electronic text content to the e-reader device and the semantic server application.

17. The system of claim 15, wherein the semantic server application includes user profiles having information that is useable to generate semantic maps for determining displayable semantic alternative electronic text content for particular types of targeted displayable electronic text content associated with the user profiles.

18. The system of claim 17, wherein the semantic server application provides predetermined user profiles for new users.

19. The system of claim 17, wherein the semantic server application further includes user profiles derived from user profiles aggregated from users that belong to a particular group.

20. The system of claim 17, wherein the semantic server application further includes user profiles provided by a particular interest group.

21. A computerized method for expanding a textual length of a displayable electronic text content while maintaining a meaning of the displayable electronic text content, the method comprising:
 receiving, via an electronic touch screen that displays a displayable electronic text content, a multi-touch user input that identifies the displayable electronic text content targeted for a textual length change, wherein the multi-touch user input indicates two digits of a user moving away from each other;
 interpreting the multi-touch user input as a request to expand a textual length of the targeted displayable electronic text content;
 in response to the request, determining a displayable semantic alternative electronic text content for the targeted displayable electronic text content, wherein the determined displayable semantic alternative electronic text content is different from the targeted displayable electronic text content and has a longer textual length than the targeted displayable electronic text content; and
 replacing the targeted displayable electronic text content with the determined displayable semantic alternative electronic text content.

22. An electronic reader (e-reader) device for changing a textual length of a displayable electronic text content while maintaining a meaning of the displayable electronic text content, the e-reader device comprising:
 a memory for storing data and applications;
 a processor for executing the applications;
 an electronic touch screen for displaying a displayable electronic text content and for receiving a user touch gesture comprising a multi-touch user input that identifies a portion of the displayable electronic text content targeted for a textual length change, the multi-touch user input further comprising a textual length change indication that indicates a reduction or expansion of a textual length of the displayable electronic text content; and
 a communication interface for communicating with a remote semantic server that receives requests for a displayable semantic text alternative for a targeted displayable electronic text content identified by way of the e-reader device, wherein the semantic server determines a displayable semantic alternative electronic text content for the targeted displayable electronic text content based on the textual length change indication and effects replacement of the targeted displayable electronic text content displayed by the e-reader device with the determined displayable semantic alternative electronic text content, wherein the determined displayable semantic alternative electronic text content is different from the targeted displayable electronic text content and has a different textual length than the targeted displayable electronic text content.

\* \* \* \* \*